May 29, 1928.

E. D. TILLYER ET AL 1,671,912

LENS MEASURE

Filed May 19, 1923

INVENTOR
E. D. TILLYER
N. M. BAKER
BY
Harry H. Styll
ATTORNEY

Patented May 29, 1928.

1,671,912

UNITED STATES PATENT OFFICE.

EDGAR D. TILLYER AND NELSON M. BAKER, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

LENS MEASURE.

Application filed May 19, 1923. Serial No. 640,129.

This invention relates to improvements in lens measures, and has particular reference to devices for determining the power of spherical and cylindrical ophthalmic lenses. One object of the present invention is to provide a lens measure wherein possibilities for errors will be entirely overcome.

Another object is to provide such a lens measure of simplified construction wherein errors occurring in one part will not be multiplied in the transmission through other parts.

A further object is to provide such a simplified device which will have great mechanical strength and be easier to manufacture than the lens measures heretofore in use.

Other objects and advantages will be apparent during the course of the following description taken in connection with the accompanying drawings wherein.

Similar reference characters designate corresponding parts throughout the several views.

Figure 1:
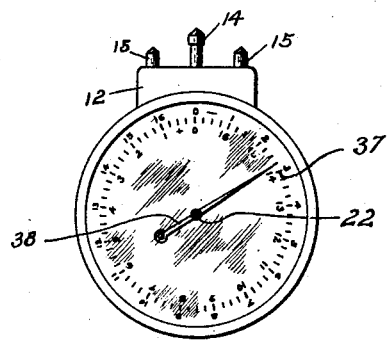
Figure 1 is a front elevation of our improved lens measure.

In the construction of our improved lens measure we provide a cylindrical casing 10, having a bottom wall 11, and at one side the usual point block 12. The point block is provided with the central bore 13, in which is slidably mounted a plunger 14. Stationary pins 15 are secured to the point block 12, as by threaded connection, or in any other suitable manner. It will be noted that the end of the plunger 14 extends beyond the end of the stationary pins 15. The ends of these pins and the plunger may be pointed as shown, or rounded, if desired.

Figure 2:
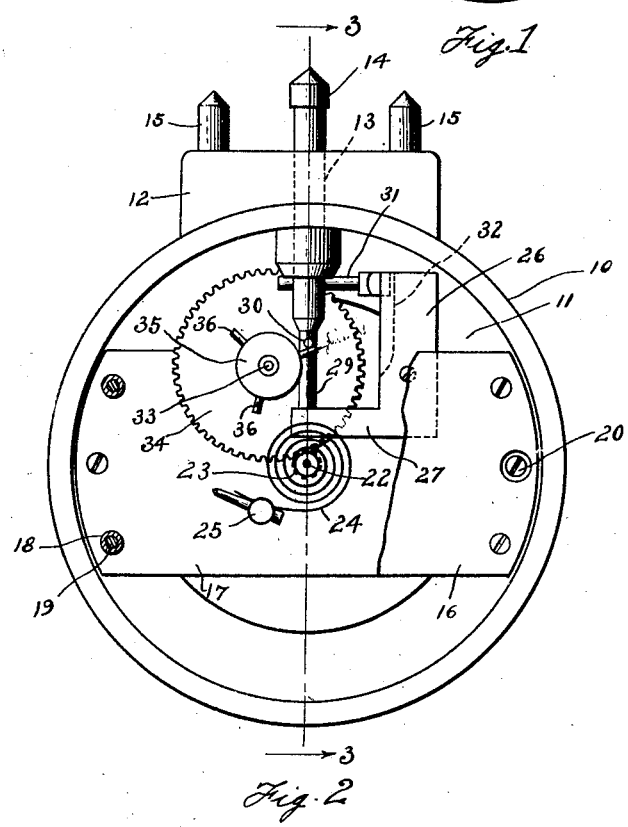
Figure 2 is a similar view on a larger scale with the dial removed and parts broken away to more clearly show the construction.
Figure 3:
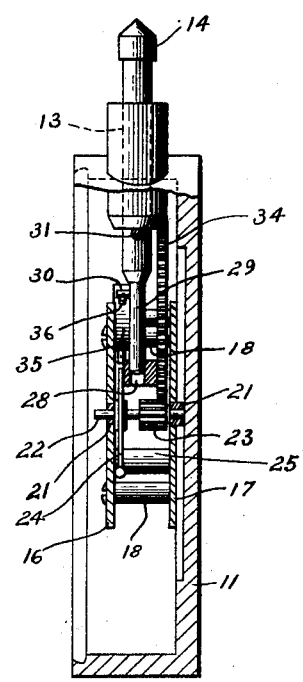
Figure 3 is a vertical transverse sectional view on the line 3—3 of Fig. 2.

Within the casing 10, we mount an upper plate 16 and lower plate 17, which are spaced apart by collars 18. through which pass the screws 19 for holding the plates together. Fastening screws 20 secure the bottom plate 17 to the bottom wall 11 of the casing, as best shown in Fig. 2.

The upper and lower plates carry centrally disposed and aligned bushings 21 which form a bearing for the central shaft 22, which is provided adjacent the lower plate with a pinion 23. A spiral spring 24 has one end secured to the shaft 22 and the other end secured in a post 25 in such a way that tension is always applied to rotate the shaft.

A bracket 26 is secured between the plates 16 and 17 and carries at its lower end a horizontal extension 27 near the end of which is a vertical bore 28 which is in alignment with the bore 13 of the point block. The plunger 14 is preferably reduced in diameter at its inner end, as shown at 29, the reduced end sliding within the opening 28 in the bracket 26. Spaced from the end of the plunger 29 and disposed at right angles thereto is a pin 30, which is preferably circular in cross section and higher up on the plunger is a horizontally disposed bar 31, which is in a plane parallel with the base 11 of the casing and suitably formed at its extremity to slide within a guiding groove 32 in the bracket 26. By this arrangement the plunger 14 will be prevented from rotating because of the fact that the extremity of the bar 31 is held within the guide 32, and because of the fact that this guide is spaced a substantial distance from the axis of the plunger the possible rotation of the plunger due to errors in machining will be negligible.

A shaft 33 is also mounted between the plates 16 and 17 parallel with the shaft 22, and carries a gear 34 which meshes with the pinion 23. Extending forwardly from the gear 34 and secured thereto is a disc 35, which is provided on its periphery with a plurality of radially disposed pins 36, one of said pins lying in the path of motion of the pin 30. While it is only necessary for one of the pins 36 to be used for engagement with the pin 30, the extra pins are provided to be used when the pin in use becomes worn, which is accomplished by setting the disc 35 with the desired pin in proper engaging position. The pressure of the spring 24 will be transmitted through the pinion 23 and gear 34 to hold the latter mentioned pin 36 in constant engagement with the pin 30, and because of the fact that both these pins are of circular cross section contact will be had at one point only.

In use the lens measure is applied to the surface of the lens in the usual manner whereby the plunger 14 will be reciprocated and motion will be imparted to the gear 34, which in turn will rotate the shaft 22. Arranged outside of the plate 16 is the usual dial 37 suitably graduated in diopters and mounted on the shaft 22 beyond the dial is a pointer 38. Thus it will be seen that a certain movement of the plunger 14 will rotate the pointer 38 and indicate on the dial 37 the amount of curvature of the surface with which the plunger 14 is in contact.

Prior to our invention devices of this sort have been equipped with racks arranged in connection with gear trains for the rotation of the pointer, but due to the smallness of the parts slight inaccuracies in the size and shape of the rack teeth were unavoidable, and such inaccuracies were transmitted to the indicating mechanism, inaccuracies in one part often being multiplied in the course of the transmission. Because of the fact that we have provided only a single point of contact between the reciprocating and the rotating member, we have eliminated the possibility of multiplication of errors, and it will be noted that this point of contact rolls in the course of the transmission of motion.

From the foregoing it will be apparent that we have produced an improved lens measure of simplified construction and rigidity of parts; obviously changes may be made in the form, proportions and arrangement of parts, and we reserve the right to make such changes falling within the scope of the claims without departing from the spirit of our invention.

What we claim is:

1. In a device of the character described in combination with a rotatable indicator operated by movable gears, a plunger reciprocally mounted between spaced bearings, a pin contact on the plunger between its bearings and extending transversely thereof, a disc member connected with the operating gears, a pin contact extending into the path of the pin on the plunger and contacting therewith, and yielding means urging the disc member and pin contact in the direction of the plunger pin whereby the indicator is moved by contact of the two pins when the plunger is reciprocated.

2. In a device of the character described in combination with a rotatable indicator operated by movable gears, a plunger reciprocally mounted between spaced bearings, means to prevent the plunger turning on its axis, a pin contact on the plunger between its bearings and extending transversely thereto, a disc member connected with the operating gears, a pin contact extending into the path of the pin on the plunger and contacting therewith, and yielding means urging the disc member and pin contact in the direction of the plunger pin whereby the indicator is moved by contact of the two pins when the plunger is reciprocated.

3. In a device of the character described in combination with a rotatable indicator operated by movable gears, a plunger reciprocally mounted between spaced bearings, a pin contact on the plunger between its bearings and extending transversely thereto, a disc member connected with the operating gears, a plurality of pin contacts extending therefrom and adapted to be extended into the path of the pin on the plunger so that any desired one of the pins may contact with the plunger pin, and yielding means urging the disc member and pin contact in engagement with the plunger pin in the direction of the plunger pin whereby the indicator is moved by the contact of the two pins when the plunger is reciprocated.

4. In a device of the character described in combination with a rotatable indicator operated by movable gears, a plunger reciprocally mounted between spaced bearings, means to prevent the plunger turning on its axis, a pin contact on the plunger between its bearings and extending transversely thereto, a disc member connected with the operating gears, a plurality of pin contacts extending therefrom and adapted to be extended into the path of the pin on the plunger so that any desired one of the pins may contact with the plunger pin, and yielding means urging the disc member and pin contact in engagement with the plunger pin in the direction of the plunger pin whereby the indicator is moved by the contact of the two pins when the plunger is reciprocated.

EDGAR D. TILLYER.
NELSON M. BAKER.